United States Patent
Rhoney et al.

(10) Patent No.: US 7,035,511 B1
(45) Date of Patent: Apr. 25, 2006

(54) PROTECTIVE CASING FOR OPTICAL FIBERS AND A FAN-OUT ASSEMBLY USING SAME

(75) Inventors: Brian K. Rhoney, Hickory, NC (US); H. Edward Hudson, II, Conover, NC (US); Martyn N. Easton, Lenoir, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 11/015,324

(22) Filed: Dec. 17, 2004

(51) Int. Cl.
*G02B 6/44* (2006.01)

(52) U.S. Cl. ............ 385/100; 385/103; 385/113

(58) Field of Classification Search ........ 385/100–114; 57/3–19; 174/70 R; 226/1–8
See application file for complete search history.

(56) References Cited

U.S. PATENT DOCUMENTS

| | | | |
|---|---|---|---|
| 4,629,286 A | 12/1986 | Fuse et al. ............... | 350/96.23 |
| 4,723,831 A | 2/1988 | Johnson et al. .......... | 350/96.23 |
| 4,730,894 A | 3/1988 | Arroyo .................... | 350/96.23 |
| 4,756,600 A | 7/1988 | Ramsay et al. ........... | 350/96.3 |
| 4,776,910 A | 10/1988 | Taylor et al. ............. | 156/145 |
| 4,902,096 A | 2/1990 | Calzolari et al. ........ | 350/96.23 |
| 4,932,746 A | 6/1990 | Calzolasri ................ | 350/96.23 |
| 5,201,020 A | 4/1993 | Kannabiran ................. | 385/113 |
| 5,561,731 A | 10/1996 | Cooke et al. ............... | 385/114 |
| 6,278,831 B1 | 8/2001 | Henderson et al. ......... | 385/139 |
| 6,389,214 B1 | 5/2002 | Smith et al. ............... | 385/136 |
| 2005/0213899 A1* | 9/2005 | Hurley et al. .............. | 385/100 |
| 2005/0213900 A1* | 9/2005 | Rhyne et al. .............. | 385/100 |

OTHER PUBLICATIONS

Port Plastics, Inc., "Acutech Ultem PEI Tubing Profiles", 2004.
Corning Cable Systems, Field Installation of Fan-Out Kits (Plus) for 4-24 Fiber Cables, 2003.
TexLoc, Ltd., "ULTEM® Detailed Properties (Polyetherimide)", 1997-2004.

* cited by examiner

*Primary Examiner*—Phan Palmer
(74) *Attorney, Agent, or Firm*—Michael E. Carroll. Jr.

(57) ABSTRACT

A robust protective casing is provided that includes an inner tubing having a passageway therethrough, an outer tubing, and a plurality of flexible strength members disposed between the inner and outer tubing. The protective casing has a wall tubing thickness ratio of the inner tubing wall thickness to the outer tubing wall thickness of about 0.5 or less while still inhibiting the kinking of the protective casing during relatively small bend radii. Additionally, an outer diameter of the protective casing is relatively small while still allowing the routing of a standard sized 900 micron tight-buffered optical fiber through the passageway. Thus, the protective casing is advantageous in applications where limited space is available space. A fan-out assembly using the protective casings is also described.

23 Claims, 1 Drawing Sheet

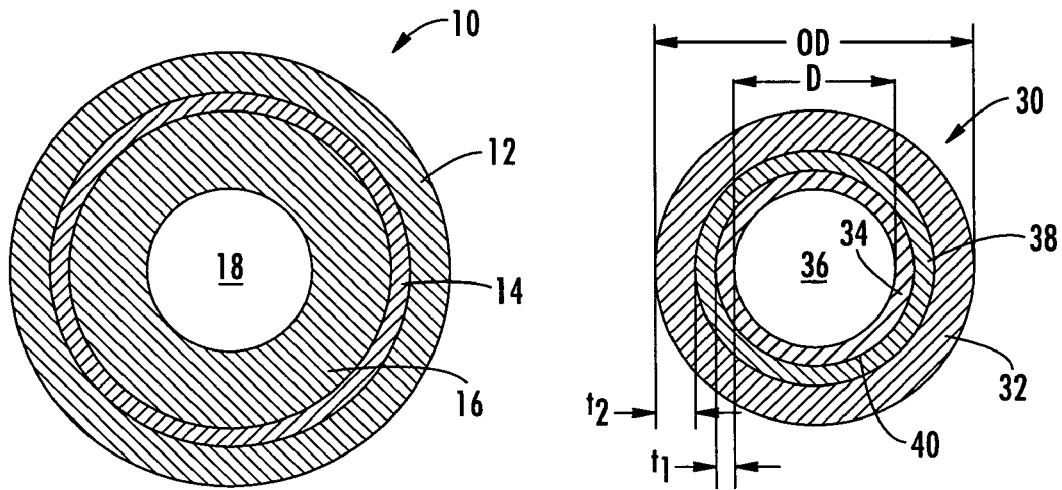
FIG. 1
(PRIOR ART)
FIG. 2
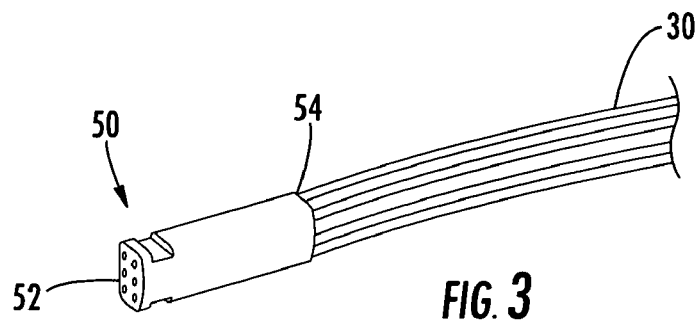
FIG. 3
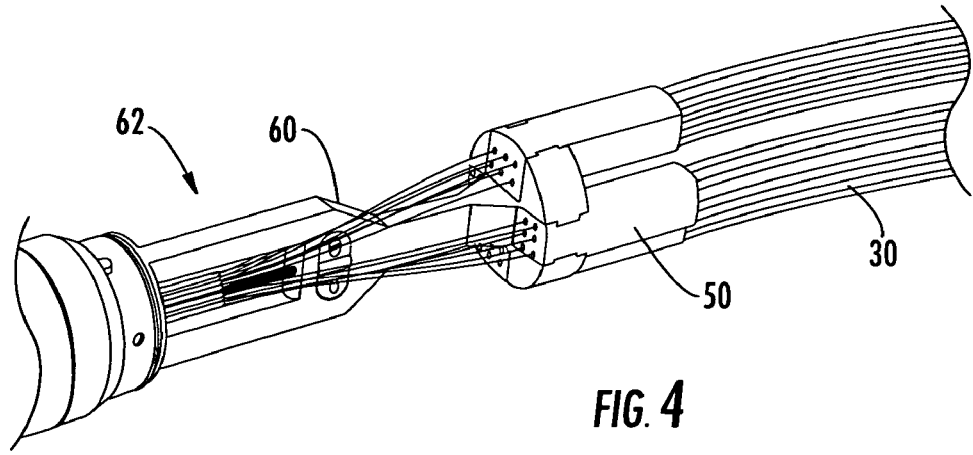
FIG. 4

PROTECTIVE CASING FOR OPTICAL FIBERS AND A FAN-OUT ASSEMBLY USING SAME

FIELD OF THE INVENTION

The present invention relates to a protective casing for optical fibers, and more particularly, a protective casing that allows optical fibers to be routed into, through, and stored in smaller spaces and a fan-out assembly using the protective casings. The protective casing according to the present invention allows tight-buffered fibers and bare optical fibers to fit therein while maintaining a relatively small footprint, providing the strength needed to protect the optical fibers, and allows forming of relatively small bend radii and winding on a reel without kinking and damaging the optical fibers.

BACKGROUND OF THE INVENTION

There are conventional furcation tubes for protecting standard sized tight-buffered optical fibers having an outer diameter of 900 microns (0.900 mm). These conventional furcation tubes are also suitable for protecting bare optical fibers, i.e., optical fibers having an outer diameter of 250 microns (0.250 mm). However, the outside diameter of the conventional furcation tubes are so relatively large that they become impractical to be used in, for instance, premise networks, where space is at a premium. In other words, the available space cannot accommodate the desired number of furcation tubes. If the outside diameter of the conventional furcation tubes were to be reduced to accommodate the space requirements and still allow tight-buffered optical fibers to fit therethrough, the walls of the protective casing become too weak, thereby allowing the protective casings to kink when bent into the required radii or wound on a reel. This kinking of the furcation tube can induce induce high stress levels, which can cause undesirable damage to the optical fibers and/or reducing of, or eliminating, of the light transmission along the optical fibers.

FIG. 1 depicts one such conventional furcation tubing 10 that is currently used for standard sized tight-buffered optical fibers having an outer diameter of 900 microns (0.9 mm). Furcation tubing 10 has an outer tubing 12, which is typically a PVC jacket and has a relatively large outer diameter of about 2900 microns (2.9 mm). A layer of aramid yarns 14 acting as flexible strength members are disposed between outer tubing 12 and an inner tubing 16. Inner tubing 16 has a central passageway 18 that is about 1070 microns (1.07 mm) in diameter for allowing the standard sized tight-buffered optical fiber to pass therethrough. The inner tubing 16 is typically made from PDVF (Polyvinylidene fluoride) or TFE (tetrafluoroethylene). To prevent the protective casing 10 from collapsing during use, the inner tubing 16 requires a relatively thick wall thickness of about 400 microns (0.4 mm). However, this required wall thickness for inner tubing 16 causes the relatively large overall size of the protective casing, i.e., 2900 microns (2.9 mm) and limits the number of furcation tubes that can pass through a given space.

Other conventional furcation tubes having smaller outer diameters are known, but in order to prevent kinking the furcation tubes and/or undesired optical attenuation require inner diameters that are too small for accommodating the standard sized tight-buffered optical. Generally speaking, these smaller conventional furcation tubes include an inner tubing having a relatively thick wall thickness to inhibit kinking and/or undesirable optical attenuation. By way of example, U.S. Pat. No. 5,201,020 discloses a protective tubing having an outside diameter of 900 microns and an inner diameter of about 500 microns. Consequently, the protective tubing is suitable for bare optical fibers, but is not suitable for receiving tight-buffered optical fibers having an outer diameter of 900 microns.

Accordingly, the present invention is directed to a protective casing that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

BRIEF DESCRIPTION OF THE DRAWINGS

The accompanying drawings are included to provide a further understanding of the invention and are incorporated in and constitute a part of the specification. The drawings illustrate several embodiments of the invention and together with the description serve to explain the principles of the invention.

FIG. 1 is a cross sectional view of a representative prior art protective casing;

FIG. 2 is a cross sectional view of a protective casing according to one embodiment of the present invention;

FIG. 3 is a perspective view of a fan-out insert plug with several protective casings according to the present invention attached thereto; and FIG. 4 is a perspective view of a portion of fan-out assembly showing a body with the fan-out insert plug of FIG. 3 attached according to one embodiment of the present invention.

DETAILED DESCRIPTION OF THE INVENTION

FIG. 2 illustrates one embodiment of a protective casing 30 according to the present invention. Protective casing 30 includes an outer tubing 32, an inner tubing 34 with a passageway 36 therethrough, and a layer of strength members 38. Outer tubing 32 is preferably PVC, but other suitable materials are possible. Outer tubing 32 has an outer diameter OD of about 2000 microns (2.00 mm) and has a wall thickness $t_2$ that is preferably about 240 microns (0.24 mm). Inner tubing 34 preferably has a wall thickness $t_1$ of about 100 microns (0.1 mm) with passageway 36 therethrough being about 1000 microns (1.02 mm) in diameter D, thereby making it suitable to receive a standard-sized 900 micron tight-buffered optical fiber. Thus, the present invention is advantageous because it solves the long-standing need for increasing the number of standard tight-buffered optical fiber protective casing runs in a given limited space. In other words, protective casing 30 has an outer diameter that is about thirty 30 percent smaller than previous furcation tubes used for standard tight-buffered optical fibers. Moreover, even though inner tubing 34 has a relatively thin wall thickness, protective casing 30 is a robust structure that inhibits kinking when bent into small radii and avoids damaging optical fibers therein, thereby preserving optical performance.

Inner tubing 34 requires a level of predetermined hoop strength for the relatively small wall thickness used so that it does not kink when bent into a small radii, thereby providing protection to the optical fiber therein. Additionally, preferred materials for inner tubing 34 must balance hoop strength with acceptable properties that allow protective casing 30 to also be flexible, yet strong enough to prevent kinking and withstand the environments into which they are installed. For example, suitable preferred materials should have a flexural strength of about 20,000 psi and/or a flexural modulus of about 500,000 psi using ASTM D790, a compressive strength of about 22,000 psi using ASTM D695, and a tensile strength of about 16,500 psi. Materials may also have a suitable resistance to chemicals and solvents and along with suitable temperature performance. By way of example, materials for inner tubing 34 can include suitable grades of polyetherimide, polyetheretherketone, or fluoroplastic THV. One suitable inner tubing 34 is a polyetherimide tubing such as commercially available from Zeus, Inc., of Orangeburg, S.C. made from ULTEM®. The materials mentioned above as well as others with similar characteristics can be appropriate for use with the protective casing 30 having the characteristics of the present invention. Passageway 36 of inner tubing 34 is depicted having a round cross-section, but other appropriate shapes are possible. For instance, the concepts of the present invention are also suitable for a rectangular protective casing suitable for receiving ribbons.

Outer diameter OD of the protective casing 30, which corresponds to the outer surface of the outer tubing 32, is about 2 mm and the diameter D of the passageway 36 is about 1 mm. Consequently, the ratio of a cross sectional area of the passageway 36 to the cross sectional area of the protective casing 30 is about 0.25 (0.25 mm$^2$/1.00 mm$^2$). The ratio of the cross sectional areas could be less than 0.25 if the passageway 36 were slightly smaller or the protective casing 30 were slightly larger. Likewise, the ratio could be larger than 0.25; however, in either case the protective casing should inhibit kinking in relatively small bend radii. Additionally, passageway 36 has limits on its size if it is intended for receiving a standard sized tight-buffered optical fiber having a 900 micron diameter. Of course, the concepts of the present invention can be applied to protective casings suitable for a standard sized bare optical fiber, i.e. 250 microns, or buffered fibers having diameters smaller than 900 microns such as 700 or 500 microns with, for instance, respective passageways of 350, 600, or 800 microns. In these embodiments, a smaller passageway is permissible, but the protective casing would not be suitable for the 900 microns tight-buffered optical fiber. The outer diameter OD of the protective casing 30 could also be made larger, to further reduce the ratio of the areas, but generally speaking larger outer diameters for protective casings are not desired for applications with limited space, but they are possible within the concepts of the invention.

Generally speaking, the wall thickness $t_1$ of inner tubing 34 is smaller than the wall thickness $t_2$ of outer tubing 32. In the embodiment shown, the wall thickness $t_2$ of the outer tubing 32 is preferably about 240 microns (0.24 mm) and the wall thickness $t_1$ of the inner tubing 34 is about 100 microns (0.1 mm), meaning that a ratio of the inner tubing wall thickness to the outer wall thickness is preferably about 0.4. Protective casings of the invention preferably have a ratio of wall thicknesses ($t_1/t_2$) of about 0.5 or less, more preferably about 0.45 or less. Using an inner tubing wall thickness that are about one-half the size of the outer tubing wall thickness allows for a compact footprint for the protective casing. Of course variations are possible, but whatever wall thickness ratio used or desired, the structure should be robust enough to protect the optical fiber therein. In other words, the wall thickness ratio is adjustable according to needs of a given application.

Protective casing 30 also includes at least one tensile strength member. In this case, the layer of strength members 38 is positioned between the outer tubing 32 and the inner tubing 34 for carrying any applied tensile load. Preferably, the strength members are aramid fibers or fiberglass fibers that allow flexibility while providing the necessary tensile strength, but other materials are possible. In the embodiment shown, the layer of strength members 38 is preferably eight strands of 380 denier aramid yarn that are wrapped about the outer surface 40 of the inner tubing 34 during manufacture. While there are preferably eight strands, more or fewer strands and/or different deniers of the strength members 38 may be used. Additionally, strength members 38 may not completely surround the outer surface 40 of the inner tubing 34 as depicted and still fall within the scope of the present invention. For example, the strength members 38 may only be placed on opposite sides of the protective casing. Similary, there may be three or four discreet placements of the strength members 38 around the outer surface 40. One explanatory embodiment uses two or three strands of a larger 1400 denier aramid strength members spaced in discrete radial locations about the inner tubing.

Protective casing 30 may be used by itself or as a part of a cable or other assemblies as shown in FIGS. 3 and 4. Typically, when large numbers of the protective casings 30 are used they are usually attached to a fan-out insert plug 50, thereby providing a dense array. When a fiber optic cable is terminated with several connectors rather than with a single connector, a fan-out assembly is often used, thereby giving the assembly the flexibility to route the individual connectors to the desired location. In order to appropriately route the optical fibers from the fiber optic cable to the connectors, an insert plug may be used to control and manage the protective casings containing the optical fibers. FIG. 3 illustrates one embodiment of fan-out insert plug 50 having several protective casings 30 attached thereto. Typically, protective casings 30 have a friction-fit within fan-out insert plug 50, but they are attachable in other manners. Fan-out insert plug 50 has a first end 52 into which optical fibers from the fiber optic cable are inserted. A second end 54 has openings with an inner diameter that corresponds to the outer diameter of the protective casing 30 so that the protective casings 30 can be inserted therein. While fan-out insert plug 50 has a specific configuration in FIG. 3, any appropriate configuration of the fan-out insert plug 50 is within the scope of the invention. Also, while the protective casings 30 are inserted into the holes in the fan-out insert plug 50, they are attachable to a fan-out insert plug in any manner such as adhesive, ultrasonically welding, or attached by an appropriate structure, etc.

Fan-out insert plug 50 having the protective casing is generally attached to a larger cable assembly 62 as shown in FIG. 4. While the specific layout of cable assemblies can vary depending on the location of the installation and application, the number of optical fibers to be branched out, and the need for protection of the optical fibers, the fan-out insert plug 50 is typically attached to a body 60 of the cable assembly 62. As depicted, body 60 is an elongated structure with multiple fan-out insert plugs 50 attached to one end thereof in a radial manner; however, other configurations of the body and the location and method of attaching the fan-out insert plugs to that body also fall within the scope of the present invention. Generally speaking, the body 60 of the cable assembly is the main structure to which the components of the assembly are attached. For example, the central member of a fiber optic cable, the shell or cover of the fan-out, the compression pieces, the strength members, etc., are generally attached to the body. Thus, the present invention allows the routing of the optical fibers of a cable in a smaller footprint than was previously possible with the conventional furcation tubes suitable for 900 micron tight-buffered optical fibers.

It will be apparent to those skilled in the art that various modifications and variations can be made with the protective casing and/or assemblies of the present invention without departing from the spirit or scope of the invention. Thus, it is intended that the present invention cover the modifications and variations of this invention provided they come within the scope of the appended claims and their equivalents.

The invention claimed is:

1. A protective casing for an optical waveguide fiber comprising:
   an inner tubing, the inner tubing having an inner surface and an outer surface defining an inner tubing wall thickness therebetween;
   an outer tubing, the outer tubing having an inner surface and an outer surface defining an outer tubing wall thickness therebetween, a wall tubing thickness ratio of the inner tubing wall thickness to the outer tubing wall thickness being about 0.5 or less, wherein the outer tubing has an outer diameter of about 2000 microns; and
   a plurality of flexible strength members, the plurality of flexible strength members being disposed between the outer surface of the inner tubing and the inner surface of the outer tubing.

2. The protective casing of claim 1, the inner tubing being a polyetherimide material.

3. The protective casing of claim 1, the inner tubing wall thickness being about 100 microns.

4. The protective casing of claim 1, the inner surface of the inner tubing having a round profile with a diameter of about 1000 microns.

5. The protective casing of claim 1, the plurality of flexible strength members being aramid fibers.

6. The protective casing of claim 1, the outer tubing being a PVC material.

7. The protective casing of claim 1, the protective casing attached to a fan-out insert plug.

8. The protective casing of claim 1, the protective casing being a portion of a fan-out assembly.

9. The protective casing of claim 1, the inner tubing defining a passageway along the protective casing with the passageway having a cross-sectional area and an outer surface of the outer tubing defining a cross-sectional area of the protective casing, wherein a cross-sectional ratio is defined as the cross-sectional area of the passageway to the cross-sectional area of the protective casing, the cross-sectional ratio being about 0.25 or less.

10. A protective casing for an optical waveguide fiber comprising:
   an inner tubing, the inner tubing having an inner surface and an outer surface, the inner surface of the inner tubing defining a passageway along the protective casing, the passageway having a cross-sectional area;
   an outer tubing, the outer tubing having an inner surface and an outer surface, the outer surface of the outer tubing defining a cross-sectional area of the protective casing, wherein a cross-sectional ratio is defined as the cross-sectional area of the passageway to the cross-sectional area of the protective casing, the cross-sectional ratio being about 0.25 or less; and
   at least one flexible strength member, the flexible strength member being disposed between the outer surface of the inner tubing and the inner surface of the outer tubing.

11. The protective casing of claim 10, the inner tubing being a polyetherimide material.

12. The protective casing of claim 10, the inner tubing wall thickness being about 100 microns.

13. The protective casing of claim 10, the inner surface of the inner tubing having a round profile with a diameter of about 1000 microns.

14. The protective casing of claim 10, the plurality of flexible strength members being aramid fibers.

15. The protective casing of claim 10, the outer tubing being a PVC material.

16. The protective casing of claim 10, the protective casing attached to a fan-out insert plug.

17. The protective casing of claim 10, the protective casing being a portion of a fan-out assembly.

18. The protective casing of claim 10, the outer tubing having an outer diameter of about 2000 microns.

19. A fan-out assembly comprising:
   at least one a protective casing, the at least one protective casing comprising:
      an inner tubing, the inner tubing having an inner surface and an outer surface defining an inner tubing wall thickness therebetween;
      an outer tubing, the outer tubing having an inner surface and an outer surface defining an outer tubing wall thickness therebetween, a wall tubing thickness ratio of the inner tubing wall thickness to the outer tubing wall thickness being about 0.5 or less, wherein the outer tubing has an outer diameter of about 2000 microns; and
      a plurality of flexible strength member, the flexible strength member being disposed between the outer surface of the inner tubing and the inner surface of the outer tubing;
   a fan-out insert plug attached to the at least one protective casing; and
   a body attached to the fan-out insert plug.

20. The protective casing of claim 19, the inner tubing being a polyetherimide material.

21. The protective casing of claim 19, the inner tubing wall thickness being about 100 microns.

22. The protective casing of claim 19, the inner surface of the inner tubing having a round profile with a diameter of about 1000 microns.

23. The protective casing of claim 19, the inner tubing defining a passageway along the protective casing with the passageway having a cross-sectional area and an outer surface of the outer tubing defining a cross-sectional area of the protective casing, wherein a cross-sectional ratio is defined as the cross-sectional area of the passageway to the cross-sectional area of the protective casing, the cross-sectional ratio being about 0.25 or less.

* * * * *